May 12, 1942.  J. F. DAY  2,282,709
SWITCH FOR DIRECTIONAL SIGNALS
Filed March 12, 1941   2 Sheets-Sheet 1

Joseph F. Day.
INVENTOR
BY Victor J. Evans & Co.
ATTORNEYS

May 12, 1942.　　　　　J. F. DAY　　　　　2,282,709
SWITCH FOR DIRECTIONAL SIGNALS
Filed March 12, 1941　　2 Sheets-Sheet 2
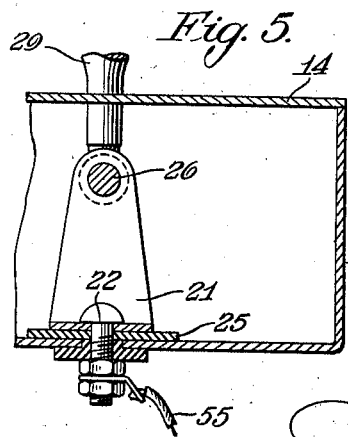
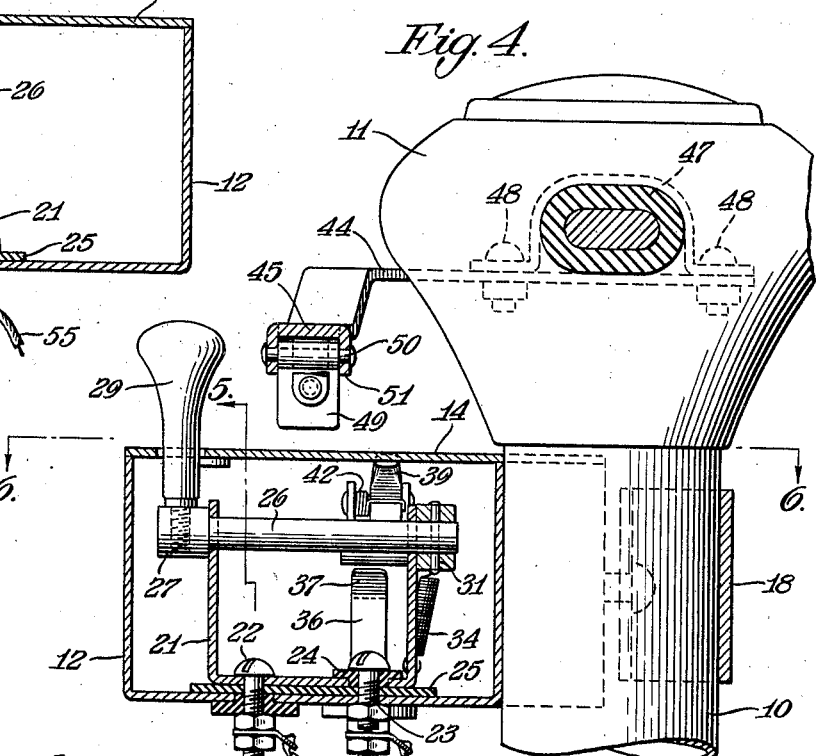
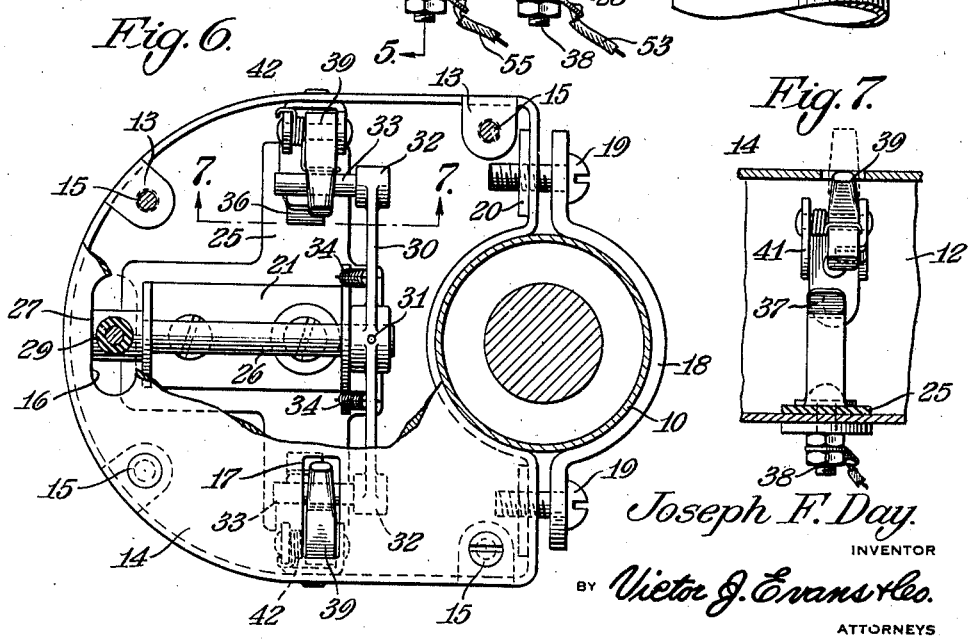
Joseph F. Day,
INVENTOR
BY Victor J. Evans & Co.
ATTORNEYS Patented May 12, 1942

2,282,709

UNITED STATES PATENT OFFICE 2,282,709

SWITCH FOR DIRECTIONAL SIGNALS

Joseph F. Day, Royal Oak, Mich.

Application March 12, 1941, Serial No. 383,025

3 Claims. (Cl. 200—59)

The present invention relates to improvements in switches for directional signals.

An object of the invention is to provide a directional signal switch of generally improved design.

Another object of the invention is the provision of a directional signal switch constructed so as to enable convenient operation by the driver of a vehicle.

A further object of the invention is to provide a directional signal switch which is efficient and reliable in operation.

Still another object of the invention is the provision of a switch of the aforesaid character which is compact and durable in construction and which can be readily attached to the conventional structure of an automobile.

Other objects and advantages of the invention will become apparent as the description progresses.

Figure 1:
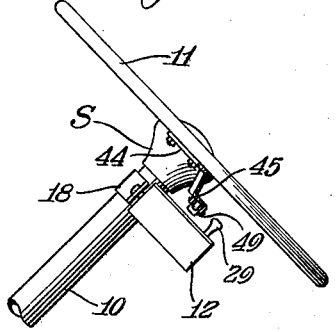
Figure 2:
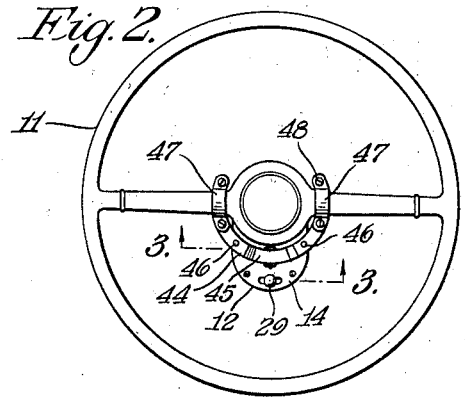
Figure 3:
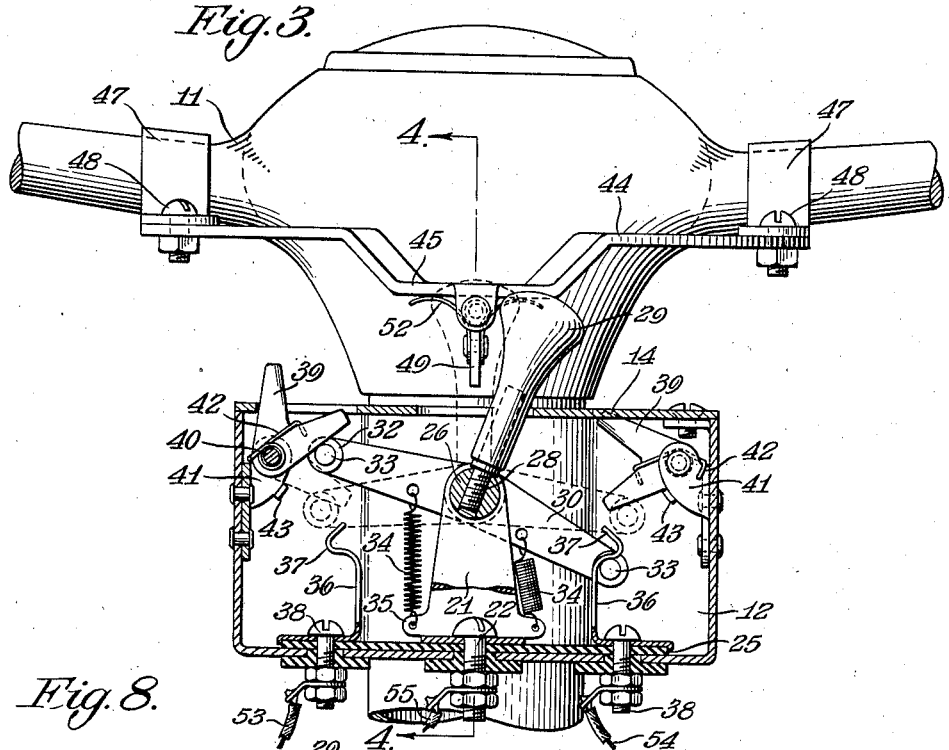
Figure 8:
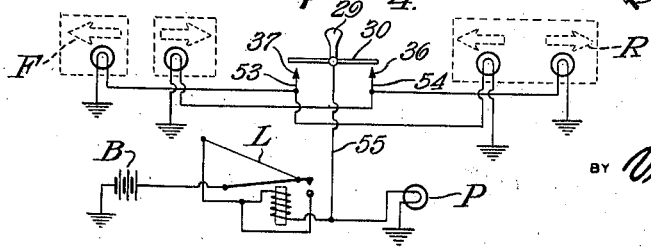

In the accompanying drawings forming a part of this specification and in which like numerals are employed to designate corresponding parts throughout:

Figure 1 is a side elevational view of the improved switch mechanism operatively mounted on the steering apparatus of an automobile, Figure 2 is a top plan view of the same, Figure 3 is an enlarged sectional view taken on line 3—3 of Figure 2, Figure 4 is a transverse section taken on line 4—4 of Figure 3, Figure 5 is a fragmentary section taken on line 5—5 of Figure 4, Figure 6 is a partly broken section taken on line 6—6 of Figure 4, Figure 7 is a detailed section taken on line 7—7 of Figure 6 with the rocker structure removed, and Figure 8 is a diagrammatic view of the electric signal circuit.

Referring to the drawings, wherein for the purpose of illustration is shown a preferred example of the invention, S generally designates part of the conventional steering apparatus of an automobile embodying a steering column 10 and a wheel 11.

Shaped for mounting on the column 10 is a casing body 12 having the side walls formed to provide straight parallel sections merging into a curved outer section and the rear wall formed with an indentation designed to partially embrace the column. The bottom of the casing is flat while the open top is formed with a plurality of inwardly projecting threaded lugs 13 designed to accommodate thereon a flat removable cover 14 normally fastened in position by screws 15 extended through apertures therein and threadedly engaging the lugs 13. Adjacent the outer edge the cover is provided with an elongated slot 16 while slots of similar formation, indicated at 17, are formed adjacent the side edges. The casing is detachably secured on the column 10, adjacent the wheel 11, by means of an arcuate clamp section 18 adapted to be mounted in complementary relation with the recessed part of the casing and adjustably connected therewith by screws 19 engaging threaded bores in the rear wall of the casing and in reinforcing bosses 20 provided thereon.

Mounted in longitudinally extending upstanding position in the casing 12 is a U-shaped bracket 21 having the intermediate portion firmly fastened on the bottom of the casing by screws 22 and 23. The screw 22 makes contact with the bracket while the complementary fastening screw 23 is insulated therefrom by an insulating washer 24, a plate 25 of insulating material being positioned on the bottom of the casing to insulate the same from the conductive members thereon. In aligned apertures in the upper ends of the bracket is mounted a rotary shaft 26 of conducting material having an enlarged head portion 27 at the outer end to which is connected, by a threaded stud 28, a radial handle 29 projecting through the slot 16.

On the opposite end of the shaft 26 is fastened a rocker bar 30 having a center hub portion fixed on the shaft by a pin 31 and formed at each end with a socket 32 in which is fastened the inner end of a laterally projecting actuating member or pin 33. To each side extension of the rocker 30 is connected the upper end of a coiled tension spring 34 having the bottom end fastened to an ear 35 at the foot of the bracket 21, this complementary pair of springs being designed to normally maintain the arm in biased transverse arrangement as shown in broken lines at Figure 3. At opposed sides of the bracket 21 are mounted a pair of complementary upstanding fixed contacts 36, each of which embodies a spring metal strip bent in V-shaped formation at the top to form an outwardly directed hook 37 designed to slidingly engage the adjacent pin 33 of the rocker. The bottom flange of each of these contacts is fastened to the bottom of the casing by a screw 38 which firmly retains the flange on the insulating plate 25 and which also serves as a conductor terminal as will be hereinafter described.

In the upper side portions of the casing, above the contacts 36 are provided a pair of angular, approximately V-shaped, trip levers 39, each of which is attached, through the medium of a pivot 40, with a support bracket 41. A spring 42 coiled about the pivot 40 and engaging the bracket and lever functions to yieldingly swing the lever to a downward retracted position within the casing and against a stop lug 43.

To the steering wheel 11 is connected a movable section of the device embodying a segmental rigid member 44 downwardly offset at the center portion as indicated at 45 and provided with spaced apertures 46 in the end portions. This segment is detachably fastened about the hub of the wheel by a pair of arcuate clamp elements 47 designed to embrace the wheel spokes and fastened to the segment by screws 48. At the medial portion of the segment is mounted a laterally depending trip tongue 49 pivotally connected with the segment by a pivot connection embodying a pivot pin 50 extending through apertured lugs 51 on the segment. This tongue is yieldingly maintained in a laterally projecting position on the segment by a pair of arcuate leaf springs 52 attached to the side faces of the tongue and bearing against the segment as shown to advantage at Figure 3.

As shown at Figure 8, this switch mechanism is connected in circuit with a pair of front direction indicating lights F and a pair of rear indicating lights R and in connection with a source of electrical current such as the battery B, a conventional flasher L and a pilot light P which may be mounted on the instrument board of the automobile. Conductors 53 and 54 connect the respective contacts 36 with a front and rear light on each side of the vehicle while a wire 55 unites the bracket 21, rocker 30 and pins 33 with the other side of the circuit.

When a vehicle equipped with the improved switch mechanism is moving in a straight forward direction the actuating handle 29 is disposed to project straight out from the casing so that the rocker pins 33 are disengaged from the contacts 36 and the spring pressed levers 39 are in retracted arrangement, the rocker being biased in such inoperative position by the balancing springs 34. When approaching the intersection at which it is intended to make a right hand turn the driver swings the handle to a position tilted toward the right, as illustrated at Figure 3, causing the right hand rocker pin 33 to slide over and engage the hook of the resilient right hand contact member 36 to releasably lock the rocker in tilted position. As the right hand rocker pin is lowered the left hand pin is correspondingly elevated and acts against the left hand trip lever 39 to swing the same upwardly so that one leg thereof swings to an upstanding position in one of the slots 17 against the force of the spring 42. This arrangement is maintained until completion of the right hand steering movement, the tongue 49 wiping across the projected leg of the lever 39 during the turning of the steering wheel without moving this lever. As the steering wheel is returned to straight forward driving position the tongue 49, during its return arcuate movement, strikes the upstanding leg of the left hand lever 39 and swings the lever downwardly to retracted position and the wheel in turn swings the rocker to disengage the right hand pin thereof from the resilient contact hook so as to restore the rocker to its transversely disposed neutral or open position. While the pin 33, which constitutes a contact member through its electrical connection with the rocker and bracket, engages the right hand hook member 36 the electric circuit through the front and rear signal lights at the right side of the vehicle is closed to flash these lights and the pilot light is illuminated to indicate proper operation of the circuit. Should either of the lights be defective the circuit would remain open and the pilot light would be inoperative so as to designate a defective condition.

To designate the intention to make a left hand turn the driver swings the handle 29 from its center position to the left to reverse the connection so that the left rocker pin engages the adjacent hook of the contact strip 36 while the opposite pin elevates the lever 39 at the right side of the casing, closing the circuit through the signal lights at the left side of the vehicle.

As will be readily apparent this provides a compact, relatively simple switch mechanism which is conveniently operable by the driver of the vehicle to energize direction indicating lights. While the initial switch operation is effected by manual movement of the handle the disconnection of the switch contacts to open the circuit is effected automatically by the movable trip element or trigger, preventing accidental operation of the lights while the vehicle is proceeding in a straight forward path without intention of turning.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In switch mechanism for directional signal systems for automobiles, a fixed casing, a pair of resilient contact terminals secured in the casing, a rocker bar mounted in the casing, a contact element extending laterally from each end of the rocker bar releasably engageable with the respective resilient terminals, a pair of angular trip levers pivotally supported in the casing and operable to engage the contact elements on the rocker bar, a spring yieldingly urging each trip lever to retracted position and to dispose the rocker bar so that the contact elements thereon are disengaged from the resilient terminals, the said levers being respectively movable to projecting positions by manual movement of the rocker bar, and a movable tripping tongue operable to retract the said levers.

2. In signal switch mechanism for automobiles, a casing adapted to be mounted in fixed position on the steering column, a bar rockably supported in the casing, a contact pin fixed to and projecting laterally from each end of the said rockable bar, a pair of resilient contacts secured in the casing, the said bar being rockable to releasably engage one of the contact pins thereon with one of the resilient contacts and to a position disengaging both of the contact pins, a pair of V-shaped levers pivotally supported in the casing and engageable with the respective contact pins of the bar, a spring engaging each of the said levers and yieldingly urging the same to a retracted position so as to urge the bar to a contact disengaging arrangement, the said levers being movable to extend a projection thereof upon contact engaging movement of the rockable bar, and a pivoted tripping tongue carried by the steering wheel of the automobile operable to wipe across the extended projection of each lever upon movement of the tongue in one direction and to swing the said lever to a retracted contact disengaging position upon reverse movement thereof.

3. In signal switch mechanism for automobiles, a casing adapted to be mounted in fixed position on the steering column, a bar rockably supported in the casing, a contact pin fixed to and projecting laterally from each end of the said rockable bar, a pair of resilient contacts secured in the casing, the said bar being rockable to releasably engage one of the contact pins thereon with one of the resilient contacts and to a position disengaging both of the contact pins, a pair of V-shaped levers pivotally supported in the casing and engageable with the respective contact pins of the bar, a spring engaging each of the said levers and yieldingly urging the same to a retracted position so as to urge the bar to a contact disengaging arrangement, the said levers being movable to extend a projection thereof upon contact engaging movement of the rockable bar, a support bracket fastened to the steering wheel of the automobile, a tongue pivotally connected to and depending from the medial portion of the bracket, and a spring operative to yieldingly hold the tongue in extended tripping position for retracting the said levers upon predetermined movement of the steering wheel.

JOSEPH F. DAY.